(12) United States Patent
Zhang et al.

(10) Patent No.: US 11,770,200 B2
(45) Date of Patent: Sep. 26, 2023

(54) ON-BOARD SYNCHRONIZATION DEVICE AND SMART MACHINE

(71) Applicant: Beijing Tusen Zhitu Technology Co., Ltd., Beijing (CN)

(72) Inventors: Mingbao Zhang, Beijing (CN); Pingyuan Ji, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 329 days.

(21) Appl. No.: 17/096,851

(22) Filed: Nov. 12, 2020

(65) Prior Publication Data

US 2021/0152265 A1 May 20, 2021

(30) Foreign Application Priority Data

Nov. 14, 2019 (CN) .......................... 201921981863.6

(51) Int. Cl.
| | |
|---|---|
| *H04J 3/06* | (2006.01) |
| *G04R 20/04* | (2013.01) |
| *G01S 19/14* | (2010.01) |
| *G01S 19/37* | (2010.01) |
| *G01S 19/25* | (2010.01) |

(52) U.S. Cl.
CPC .............. *H04J 3/065* (2013.01); *G01S 19/14* (2013.01); *G01S 19/256* (2013.01); *G01S 19/37* (2013.01); *G04R 20/04* (2013.01)

(58) Field of Classification Search
CPC ........ H04J 3/065; G01S 19/14; G01S 19/256; G04R 20/04
See application file for complete search history.

(56) References Cited

U.S. PATENT DOCUMENTS

| | | | |
|---|---|---|---|
| 2015/0281809 A1* | 10/2015 | Foster, III | H04Q 9/04 340/870.26 |
| 2017/0127368 A1* | 5/2017 | Wang | G01S 19/14 |
| 2021/0354719 A1* | 11/2021 | Wang | G06V 20/588 |

* cited by examiner

*Primary Examiner* — Sharmin Chowdhury
*Assistant Examiner* — Angelie T Ngo
(74) *Attorney, Agent, or Firm* — Perkins Coie LLP (57) ABSTRACT

The present disclosure provides an on-board synchronization device. The on-board synchronization device includes: a first circuit and at least one second circuit. The first circuit is configured to receive an initial signal containing Universal Time Coordinated (UTC), generate a first signal containing the UTC, and output the first signal to at least one on-board device, such that the at least one on-board device synchronizes its built-in clock with the UTC based on the first signal. The second circuit is configured to receive a Pulse Per Second (PPS) signal, generate a periodic second signal with a same phase as the PPS signal, and output the second signal or the PPS signal to the at least one on-board device, such that the at least one on-board device performs a predetermined action based on the second signal or the PPS signal.

20 Claims, 11 Drawing Sheets

ON-BOARD SYNCHRONIZATION DEVICE AND SMART MACHINE

CROSS-REFERENCE TO RELATED APPLICATION

The present disclosure claims priority to Chinese Patent Application No. 201921981863.6, titled "ON-BOARD SYNCHRONIZATION DEVICE AND SMART MACHINE", filed on Nov. 14, 2019, the content of which is incorporated herein by reference in its entirety.

TECHNICAL FIELD

The present disclosure relates to sensor technology, and more particularly, to an on-board synchronization device and a smart machine.

BACKGROUND

This section is intended to provide a background or context for embodiments of the application as stated in the claims. The description here is not admitted as prior art because of its inclusion in this section.

In smart machines such as autonomous vehicles, unmanned aerial vehicles, robots, etc., sensors such as integrated navigation units, cameras, and laser radars are typically used to collect position and environmental information, and Electronic Control Units (ECUs) such as industrial controllers, servers, and Application-Specific Integrated Circuits (ASICs) are typically used to process the data collected by the sensors to locate and perceive objects in the surrounding environment, and make behavioral decisions accordingly. The process can be described roughly as follows. An integrated navigation unit collects position data of a smart machine in real time. A camera collects image data of the surrounding environment of the smart machine in real time. A laser radar collects point cloud data of objects around the smart machine in real time. After receiving the position data, image data, and point cloud data collected by the sensor in real time, an electronic control unit, such as an industrial controller, a server, or an ASIC, aligns them according to their timestamps and performs a fusion process, so as to locate the smart machine in real time and perceive the objects in its surrounding environment in real time, and then make a behavioral decision such as avoiding and lane changing based on the positioning and perception results.

SUMMARY

It can be seen from the above process that the accuracy of the positioning and perception results will directly affect whether the behavioral decision made by the smart machine are reasonable. However, currently the smart machines have the following defects.

First of all, different clock sources may be used in different types of sensors and between the sensors and a processor. After the sensors transmit the collected data to the processor, the processor uses the time when the data is received as its timestamp. On one hand, it will cause the timestamp to be delayed when compared to the time when the sensors actually collect the data. On the other hand, it may cause different data with the same timestamp to actually represent the physical world at different times.

Second, different types of sensors may have different triggering time. When the different types of sensors collect information according to their respective frequencies, it is difficult to ensure that the sensors can collect data at the same time due to the inconsistent triggering time, which makes it difficult to achieve data alignment during a subsequent data fusion process, thereby making the fusion process more difficult.

Based on the above factors, currently the smart machines cannot obtain accurate positioning and perception results.

In order to solve the above-mentioned problems, the embodiments of the present disclosure provide an on-board synchronization device and a smart machine.

According to a first aspect of the present disclosure, an on-board synchronization device is provided. The on-board synchronization device includes a first circuit and at least one second circuit. The first circuit is configured to receive an initial signal containing Universal Time Coordinated (UTC), generate a first signal containing the UTC, and output the first signal to at least one on-board device, such that the at least one on-board device synchronizes its built-in clock with the UTC based on the first signal. The second circuit is configured to receive a Pulse Per Second (PPS) signal, generate a periodic second signal with a same phase as the PPS signal, and output the second signal or the PPS signal to the at least one on-board device, such that the at least one on-board device performs a predetermined action based on the second signal or the PPS signal.

According to a second aspect of the present disclosure, a smart machine is provided. The smart machine includes at least one on-board device, a satellite positioning device, and the on-board synchronization device according to the above first aspect.

With the above technical solutions, the on-board synchronization device according to the present disclosure can allow built-in clocks of various on-board devices in a smart machine to maintain accurately synchronized with UTC, thereby ensuring that all devices can use a unified clock source, while enabling the sensors in the smart machine to be triggered at the same time to collect data. This is beneficial to alignment and fusion processes of the data collected by the sensors, and can effectively improve the positioning and perception accuracy of the smart machine.

BRIEF DESCRIPTION OF THE DRAWINGS

In order to describe the technical solutions according to the embodiments of the present disclosure or the prior art more clearly, figures used in description of the embodiments will be introduced briefly below. Obviously, the figures described below only illustrate some embodiments of the present disclosure, and other figures can be obtained by those of ordinary skill in the art based on these drawings without any inventive efforts.

DETAILED DESCRIPTION OF THE EMBODIMENTS

In the following, the solutions according to the embodiments of the present disclosure will be described clearly and completely with reference to the figures. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

To facilitate understanding, the technical terms used in the present disclosure are explained below.

The term "Smart machine" as used in the present disclosure is broadly interpreted as including any movable objects, including, for example, aircrafts, spacecraft, ships, submarines, robots, and vehicles (including but not limited to cars, trucks, vans, semi-trailers, motorcycles, golf carts, off-road vehicles, warehouse transportation vehicles or agricultural vehicles, and transportation vehicles running on tracks, such as trams or trains and other rail vehicles).

In some examples, "smart machines" can be unmanned ships, unmanned submarines, autonomous vehicles, unmanned aerial vehicles, unmanned spacecraft, robots, etc., that use devices on-board to automatically perform actions (including but not limited to moving in the ocean, on the land, in the sky or space, interacting with the outside world, performing transportation, detection, image capturing, processing, scientific research, and military missions, etc.)

The term "autonomous vehicle" as used in the present disclosure may refer to a vehicle implemented using autonomous driving technology to carry people (such as passenger cars, buses, etc.) or cargo (such as ordinary trucks, vans, closed trucks, tank trucks, flatbed trucks, container trucks, dump trucks, trucks with special structures, etc.) or to perform special rescue functions (such as fire trucks, ambulances, etc.).

In other examples, "smart machines" can be traditional automobiles, aircrafts, spacecraft, ships, submarines, robots, etc., controlled externally (such as by humans or machines) that use devices on-board to perform actions (including but not limited to moving in the ocean, on the land, in sky or space, interacting with the outside world, and performing transportation, detection, image capturing, processing, scientific research, and military missions, etc.).

The term "and/or" as used herein only describes an association relationship between associated objects, including three relationships. For example, A and/or B may mean three situations: A only, B only, or both A and B. In addition, the symbol "/" as used herein generally means that the associated objects before and after the symbol are in an "or" relationship. In addition, any number of elements in the drawings is only for the purpose of illustration, rather than limitation, and any naming is only used for the purpose of distinguishing elements from one another and does not have any limiting meaning.

The principles and spirits of the present disclosure will be explained in detail below with reference to several representative embodiments of the present disclosure.

Smart Machine

Figure 1:
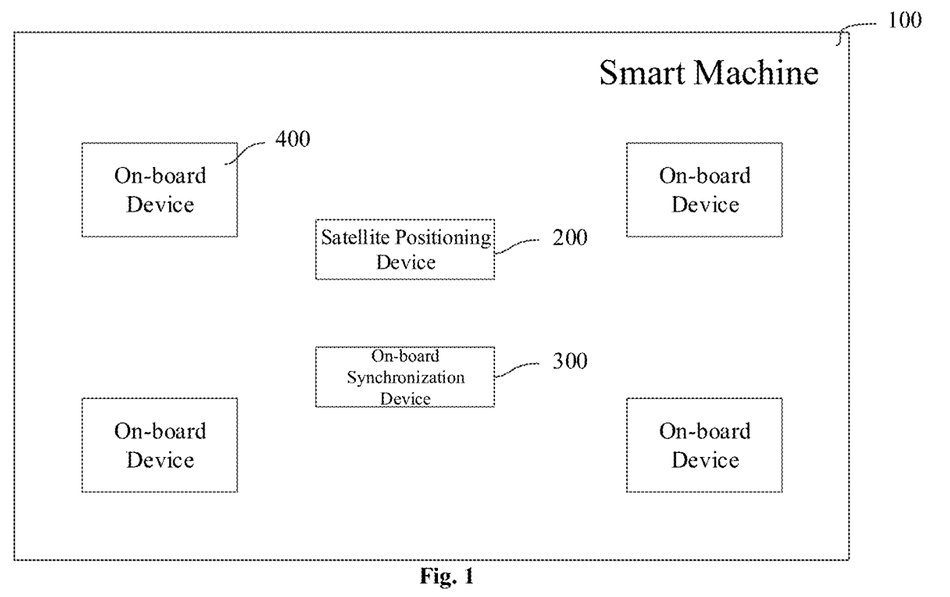
FIG. 1 is a schematic diagram showing a structure of a smart machine according to an embodiment of the present disclosure.

FIG. 1 shows a smart machine 100 according to an embodiment of the present disclosure. The smart machine 100 includes a satellite positioning device 200, an on-board synchronization device 300, and a plurality of on-board devices 400.

The satellite positioning device 200 is used to provide data for positioning, e.g., data conforming to NMEA-0183 (National Marine Electronics Association (NMEA) standard format for marine electronic devices) protocol, including but not limited to: latitude and longitude, satellite elevation, satellite azimuth, magnetic declination, Universal Time Coordinated (UTC) (accurate to year, month, day, hour, minute, and second), altitude, etc. In some examples, the satellite positioning device 200 may include, but not limited to, a Global Positioning System (GPS) positioning device, a carrier phase differential Real-Time Kinematic (RTK) positioning device, a Bei-Dou satellite positioning system positioning device, a GLONASS positioning system positioning device, a Galileo positioning system positioning device, or a Global Navigation Satellite System (GNSS) positioning device.

The on-board devices 400 can be various sensors and/or electronic control units mounted on the smart machine 100. In some examples, the on-board devices 400 may include, but not limited to, one or more of a first type of sensor, a second type of sensor, and an electronic control unit. Here, the first type of sensor can be configured to detect a distance, a speed, or both of an object. The second type of sensor can be configured to capture images. The electronic control unit can be configured to perform one or more of: receiving data from various connected electronic devices, processing data, or controlling various connected electronic devices. In some examples, the first type of sensor may include, but not limited to, sensors such as a laser radar, a millimeter wave radar, an ultrasonic radar, and a laser rangefinder. In some examples, the second type of sensor may include, but not limited to, sensors such as a Time-of-Flight (TOF) camera, a binocular stereo vision camera, a structured light depth camera, an infrared camera (near infrared camera or far infrared camera). In some examples, the electronic control unit may include, but not limited to, an industrial controller, a server, or an ASIC.

The on-board synchronization device 300 may be configured to assist some or all of the on-board devices 400 on the smart machine 100 to complete clock synchronization and triggering synchronization operations. Here, the clock synchronization means that some or all of the on-board devices 400 have the same clock source, and the triggering synchronization means that some or all of the on-board devices 400 are triggered to perform predetermined actions at the same time.

On-Board Synchronization Device

Conventionally, on-board devices such as sensors typically use built-in clocks to determine time. In addition to using built-in clocks to determine time, on-board devices such as electronic control units may also obtain network time and synchronize their built-in clocks with the network time. As the built-in clocks of the on-board devices are not synchronized with any external clock, or the source of the network time is not accurate, different on-board devices may use inconsistent time, and the clock synchronization between different on-board devices cannot be achieved, which creates severe problems in subsequent data processing operations (such as marking data with timestamps, aligning data according to timestamps, etc.).

Figure 2:
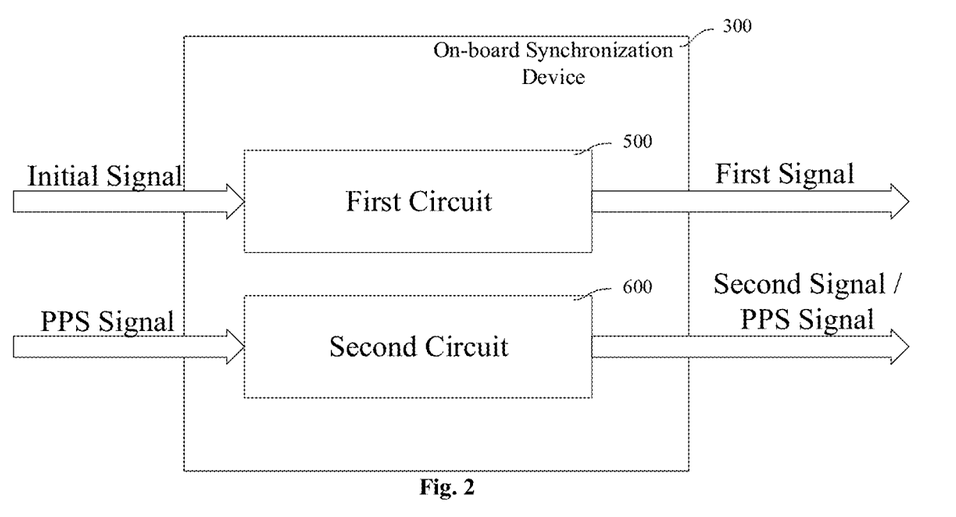
FIG. 2 is a schematic diagram showing a structure of an on-board synchronization device according to an embodiment of the present disclosure.

In order to solve the above problem, according to an embodiment of the present disclosure, as shown in FIG. 2, the on-board synchronization device 300 may be configured to include a first circuit 500. The first circuit 500 is configured to receive an initial signal containing UTC, generate a first signal containing the UTC, and output the first signal to one or more on-board devices, such that the on-board devices 400 can synchronize their built-in clocks with the UTC based on the first signal.

The first circuit 500 may be configured to receive the initial signal containing the UTC generated by the satellite positioning device 200, generate the first signal, and provide the first signal to the on-board devices 400, such that the on-board devices 400 can adjust their built-in clocks to be synchronized with the UTC based on the UTC in the first signal. This allows different on-board devices 400 on the smart machine 100 to use the UTC from the satellite positioning device 200 to synchronize their built-in clocks, i.e., different on-board devices 400 can use the satellite time as the same clock source.

The UTC can include a UTC date accurate to year, month, and day, and UTC time accurate to year, month, day, hour, minute, and second. Generally, the satellite positioning device 200 can output signals conforming to fields such as positioning information GPGGA, current satellite information GPGSA, visible satellite information GPGSV, recommended positioning information GPRMC, ground speed information GPVTG, and geographic positioning information GPGLL in the NMEA-0183 protocol. Here, GPGGA contains the UTC time (accurate to hour, minute, and second), GPRMC contains the UTC date (accurate to year, month, and day) and the UTC time (accurate to year, month, day, hour, minute, and second), and GPGLL contains the UTC time (accurate to hour, minute, and second). According to some examples of the present disclosure, the first circuit 500 may receive signals such as GPGGA, GPRMC, and GPGLL outputted from the satellite positioning device 200, and then generate the first signal.

Figure 3:
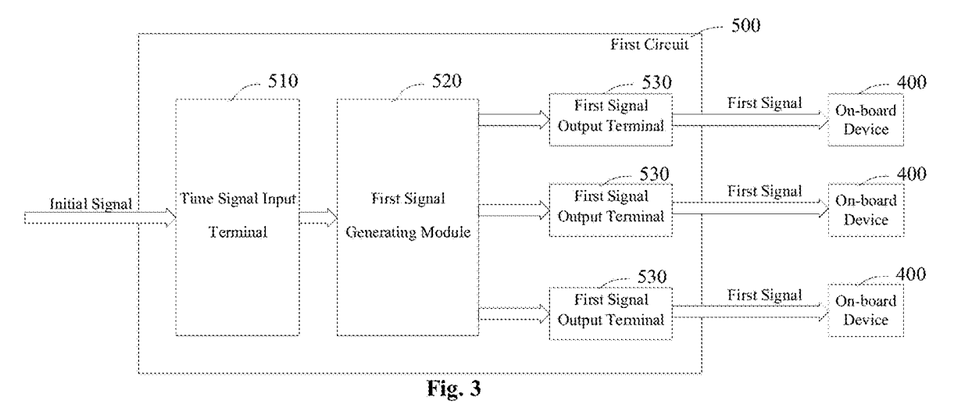
FIG. 3 is a schematic diagram showing a structure of a first circuit according to an embodiment of the present disclosure.

As shown in FIG. 3, the first circuit 500 may be configured to include a time signal input terminal 510, a first signal generating module 520, and a plurality of first signal output terminals 530. The time signal input terminal 510 is connected to the first signal generating module 520, and the first signal generating module 520 is connected to each of the plurality of first signal output terminals 530. The time signal input terminal 510 is configured to receive the initial signal containing the UTC and output it to the first signal generating module 520. The first signal generating module 520 is configured to generate the first signal based on the initial signal containing the UTC, and output it to each of the plurality of first signal output terminals 530. Each of the plurality of first signal output terminals 530 is connected to one or more on-board devices 400 for outputting the first signal to the connected one or more on-board devices 400.

Conventionally, the sensors in the smart machine 100 do not have unified triggering time. When different sensors collect information according to their respective frequencies, it is difficult to ensure that the different sensors can collect data at the same time due to the inconsistent triggering time, which makes it difficult to achieve data alignment during a subsequent data fusion process, thereby making the fusion process more difficult.

In order to solve the above problem, according to an embodiment of the present disclosure, as shown in FIG. 2, the on-board synchronization device 300 may be configured to include at least one second circuit 600. Each second circuit 600 is configured to receive a Pulse Per Second (PPS) signal, generate a periodic second signal with a same phase as the PPS signal, and output the second signal or the PPS signal to one or more on-board devices, such that the on-board devices 400 can perform a predetermined action based on the second signal or the PPS signal.

The satellite positioning device 200 can periodically output the PPS signal. Assuming that the frequency is F0, the second circuit 600 can be configured to receive the PPS signal outputted from the satellite positioning device 200 and then directly output the PPS signal to the connected on-board devices 400. Alternatively, the second circuit 600 can be configured to receive the PPS signal outputted from the satellite positioning device 200, generate a second signal with a frequency of F2=M*F0 (M is a positive integer) and the same phase as the PPS signal (the second signal is equivalent to a frequency multiplied signal of the PPS signal), and then output the second signal to the connected on-board devices 400.

For some types of on-board devices 400, the second circuit 600 connected to the on-board devices 400 may be configured to receive the PPS signal and directly output the PPS signal to the connected on-board devices 400. For example, this processing scheme can be used for sensors such as a laser radar, a millimeter wave radar, an ultrasonic radar, and a laser rangefinder. In addition, for these types of on-board devices 400, the second circuit 600 can be further configured to generate a second signal with a frequency F2=F0 (i.e., M=1) and the same phase as the PPS signal when the input PPS signal is missing (that is, the PPS signal is generated by imitation), and the second signal is outputted to these types of on-board devices 400.

For other types of on-board devices 400, the frequency F2 (or integer M) can be determined based on their types, and then the second circuit 600 connected to these types of on-board devices 400 may be configured to receive the PPS signal and generate a second signal with a frequency of F2=M*F0 and the same phase as the PPS signal, such that the on-board devices 400 can be periodically triggered to perform the predetermined action at a triggering frequency of F2. The triggering frequency F2 of the on-board devices 400 is equal to M times the frequency F0, and the value of M is dependent on the types of the on-board devices 400. In some examples, the corresponding M value or frequency F2 may be determined in advance for each of the types of on-board devices 400. In practice, the M value can be set with reference to the operation principle of the on-board devices 400. For example, for sensors such as a Time-of-Flight (TOF) camera, a binocular stereo vision camera, a structured light depth camera, or an infrared camera (near infrared camera or far infrared camera), etc., M can be set to 20.

With the configuration of each second circuit 600, the second signals are provided to various on-board devices 400, such that the on-board devices 400 can be periodically triggered to perform predetermined actions. Although the second signals provided to the on-board devices 400 may have different frequencies (depending on the types of on-board devices 400), the different on-board devices 400 can be triggered in a unified manner at the same phase since the second signals provided to the on-board devices 400 have the same phase (same as the phase of the PPS signal).

According to an embodiment, for the first type of sensor such as a laser radar, a millimeter wave radar, an ultrasonic radar, or a laser rangefinder, the predetermined action executed when it is triggered is to adjust an angle for collecting data to a predetermined angle. For example, when the second circuit 600 provides the second signal to a laser radar, the laser radar adjusts an emission angle of a laser beam to a predetermined angle (any angle from 0 to 359 degrees).

According to an embodiment, for the second type of sensor such as a TOF camera, a binocular stereo vision camera, a structured light depth camera, or an infrared camera (near infrared camera or far infrared camera), the predetermined action executed when it is triggered is to start collecting image data. For example, when the second circuit 600 provides the second signal to a binocular stereo vision camera, the binocular stereo vision camera immediately starts capturing images.

Figure 4:
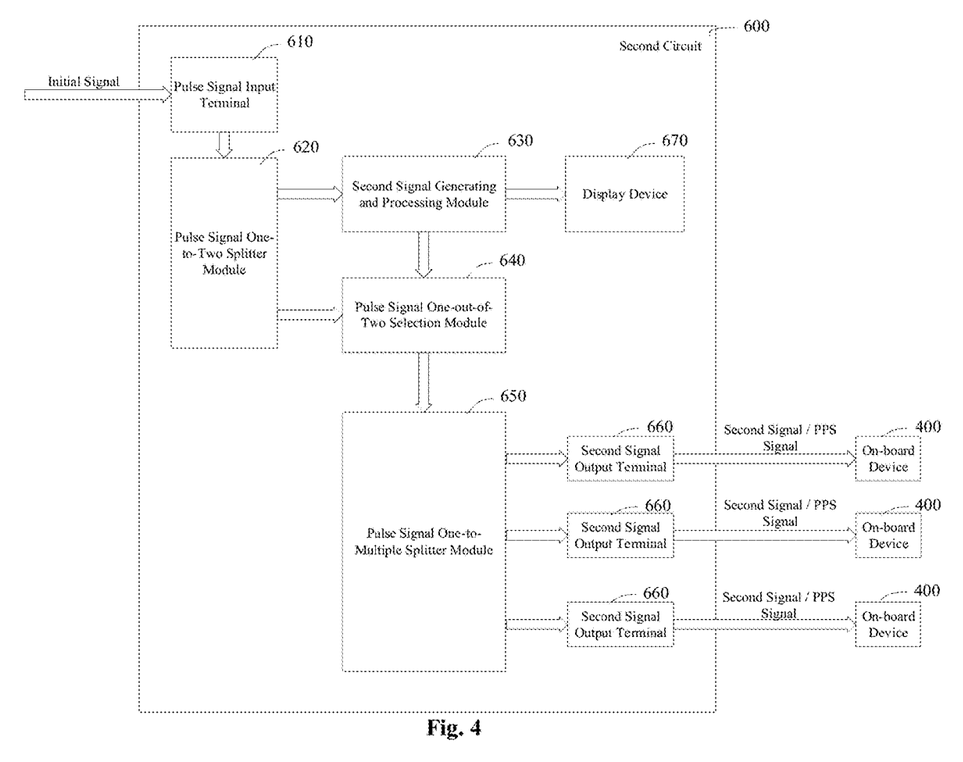
FIG. 4 is a schematic diagram showing a structure of a second circuit according to an embodiment of the present disclosure.

As shown in FIG. 4, the second circuit 600 can be configured to include a pulse signal input terminal 610, a pulse signal one-to-two splitter module 620, a second signal generating and processing module 630, a pulse signal one-out-of-two selection module 640, a pulse signal one-to-multiple splitter module 650, and a plurality of second signal output terminals 660. Here, the pulse signal input terminal 610 is connected to the pulse signal one-to-two splitter module 620, the pulse signal one-to-two splitter module 620 is connected to the second signal generating and processing module 630 and the pulse signal one-out-of-two selection module 640, respectively, the second signal generating and processing module 630 is connected to the pulse signal one-out-of-two selection module 640, the pulse signal one-out-of-two selection module 640 is connected to the pulse signal one-to-multiple splitter module 650, and the pulse signal one-to-multiple splitter module 650 is connected to each of the plurality of second signal output terminals 660. The pulse signal input terminal 610 is configured to receive the PPS signal and output it to the pulse signal one-to-two splitter module 620. The pulse signal one-to-two splitter module 620 is configured to output the PPS signal to the second signal generating and processing module 630 and the pulse signal one-out-of-two selection module 640, respectively. The second signal generating and processing module 630 is configured to generate the second signal based on the PPS signal, generate a signal source switching control signal, and output the second signal and the signal source switching control signal to the pulse signal one-out-of-two selection module 640. The pulse signal one-out-of-two selection module 640 is configured to output the PPS signal or the second signal to the pulse signal one-to-multiple splitter module 650 in accordance with the signal source switching control signal. The pulse signal one-to-multiple splitter module 650 is configured to output the PPS signal or the second signal to each of the plurality of second signal output terminals 660. Each of the plurality of second signal output terminals 660 is connected to one or more on-board devices and is configured to output the second signal or the PPS signal to the connected one or more on-board devices.

As shown in FIG. 4, the second circuit 600 may further include a display device 670. The second signal generating and processing module 630 may be further configured to generate a type indication signal and output it to the display device 670. The display device 670 can be configured to display based on the type indication signal to indicate whether the second signal or the PPS signal is outputted to the on-board devices 400. In addition, the second signal generating and processing module 630 may be further configured to generate a status indication signal and output it to the display device 670. The display device 670 can be further configured to display based on the status indication signal to indicate an operation status of the on-board synchronization device 300. Specifically, the display device 670 may use Light Emitting Diode (LED) indicators to achieve the display function.

SPECIFIC EXAMPLES

Figure 5:
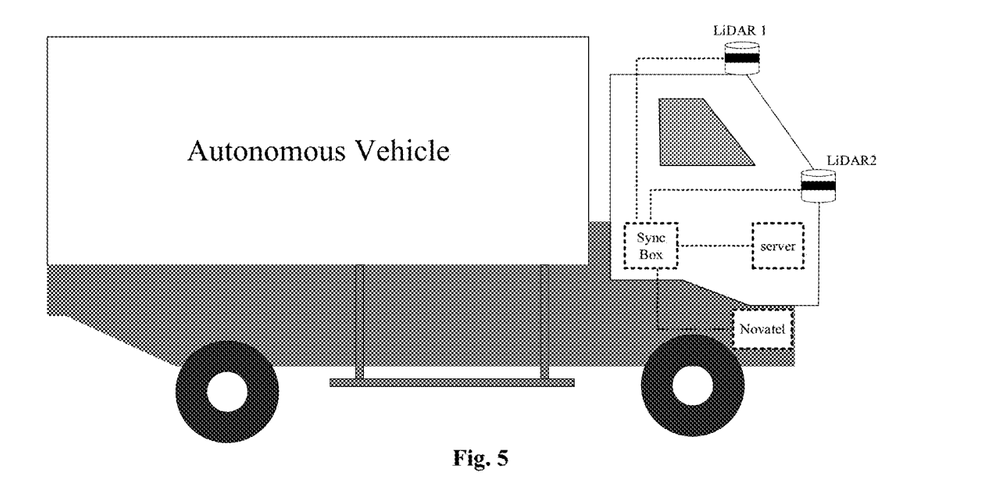
FIG. 5 is a schematic diagram showing a structure of an autonomous vehicle according to an embodiment of the present disclosure.

FIG. 5 shows an autonomous vehicle. The autonomous vehicle is equipped with a satellite positioning device (Novatel), an on-board synchronization device (Sync Box), a vehicle mounted server, and laser radars (LiDAR1 and LiDAR2).

Figure 6:
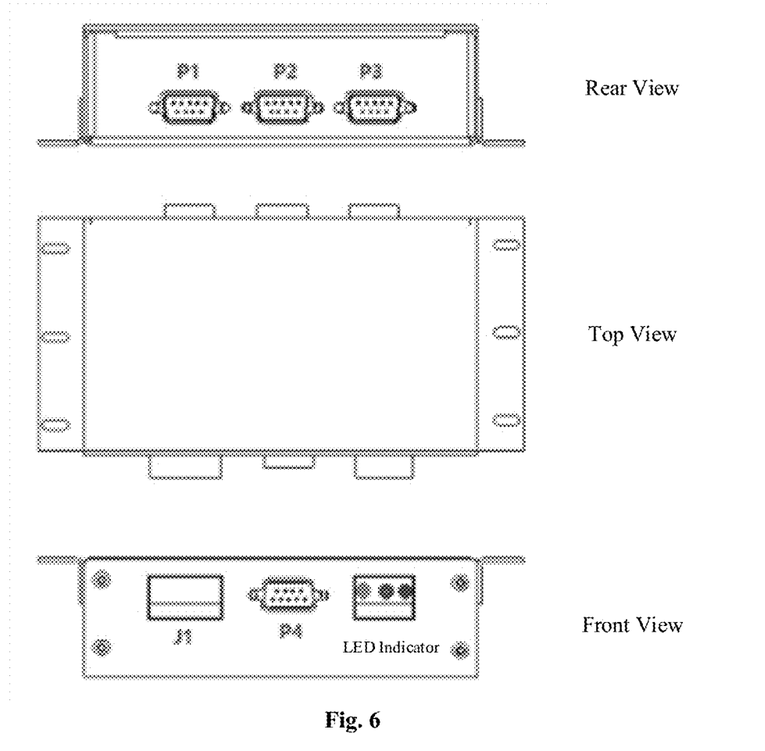
FIG. 6 is a schematic diagram showing an appearance of an on-board synchronization device, Sync Box, according to an embodiment of the present disclosure.
Figure 7:
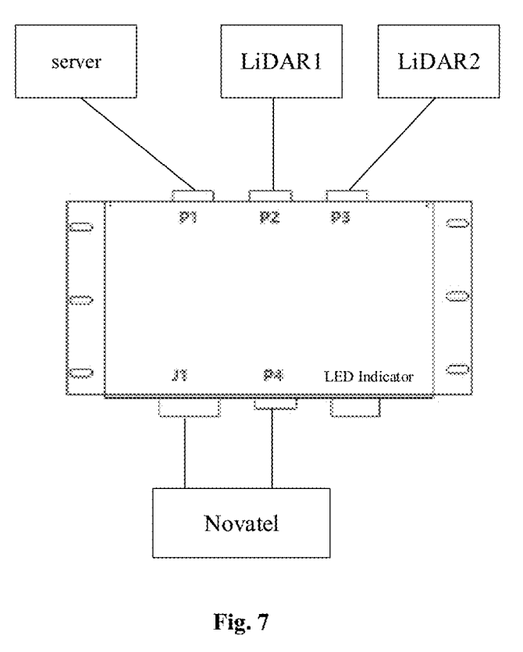
FIG. 7 is a schematic diagram showing a connection relationship between an on-board synchronization device, Sync Box, and other on-board devices according to an embodiment of the present disclosure.
Figure 8:
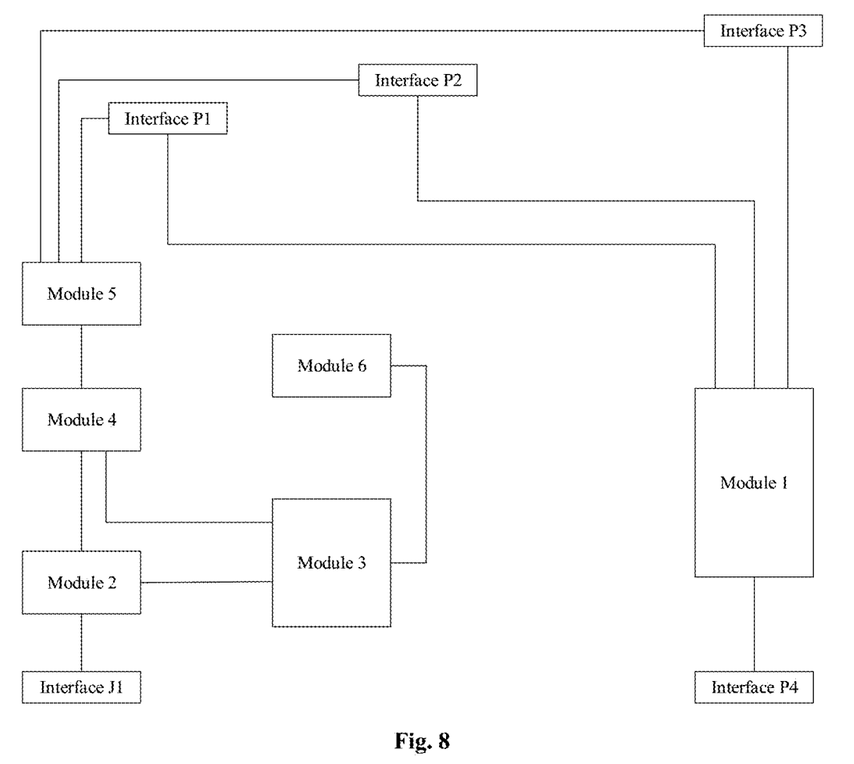
FIG. 8 is a schematic diagram showing an internal circuit structure of an on-board synchronization device, Sync Box, according to an embodiment of the present disclosure.

FIG. 6 is a schematic diagram showing an appearance of an on-board synchronization device (Sync Box), including front view, rear view, and top view. FIG. 7 shows a connection relationship between an on-board synchronization device (Sync Box) and a satellite positioning device (Novatel), a vehicle mounted server, and laser radars (LiDAR1 and LiDAR2). FIG. 8 is a schematic diagram showing an internal circuit structure of an on-board synchronization device (Sync Box).

Referring to FIGS. 6-8, the on-board synchronization device Sync Box includes: Interface P4, Module 1, Interface P1, Interface P2, Interface P3, Interface J1, Module 2, Module 3, Module 4, Module 5, and Module 6.

Interface P4 is a male DB9 connector, Interface J1 is an error-proof 5.08 mm terminal connector, Interface P1, Interface P2, and Interface P3 are female DB9 connectors, and Module 6 is a three-color LED indicator.

Interface J1 receives a PPS signal outputted from the satellite positioning device Novatel, Interface P4 receives an RS232 signal (containing UTC) outputted from the satellite positioning device Novatel, Interface P1 is connected to the vehicle mounted server, Interface P2 is connected to the laser radar LiDAR1, and Interface P3 is connected to the laser radar LiDAR2.

Module 6 uses three different colors of indicators to indicate the operation status of the device. The red indicator, when turned on, indicates that the on-board synchronization device Sync Box is operating, the yellow indicator, when turned on, indicates that Interfaces P1~P3 are outputting the second signal (a frequency multiplied signal of the PPS signal), and the green indicator, when turned on, indicates that Interfaces P1~P3 are outputting the PPS signal.

The PPS signal from the satellite positioning device Novatel is inputted to Module 2 through Interface J1. Module 2 splits the PPS signal into two signals, one outputted to Module 3 and the other outputted to Module 4. Module 3 has been pre-configured (the triggering frequency F2 for the laser radars LiDAR1 and LiDAR2 is predetermined and then Module 3 is configured accordingly) to generate the second signal (with the frequency of F2 and the same phase as the PPS signal). Module 3 generates a signal source switching control signal for controlling the type of signal outputted from Module 4. Module 4 outputs the PPS signal outputted from Module 2 or the second signal outputted from Module 3 to Module 5 according to the signal source switching control signal outputted from Module 3. Module 5 splits the PPS signal or the second signal received from Module 4 into three TTL signals and outputs them to Interfaces P1, P2, and P3.

The RS232 signal from the satellite positioning device Novatel is inputted to Module 1 through Interface P4, and Module 1 converts the RS232 signal into three RS232 signals, and outputs them to Interfaces P1, P2, and P3.

Figure 9:
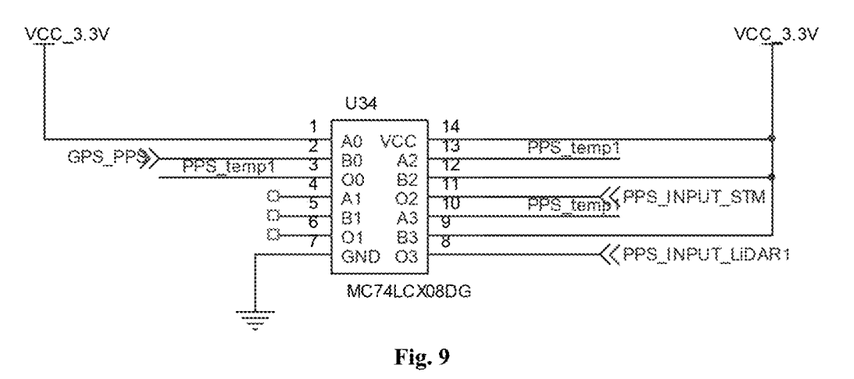
FIG. 9 is a schematic diagram of a chip used for Module 2 according to an embodiment of the present disclosure.

Referring to FIG. 9, Module 2 can be implemented with an MC74LCX08DG type of chip, which is referred to as U34 below. MC74LCX08DG used in Module 2 is a four-channel AND gate chip. In some examples, Module 2 can alternatively use other AND gate chips with similar functions to the MC74LCX08DG chip, such as an SN74HCS08, CD54ACT08, or CD74HCT08 type of chip.

Figure 10:
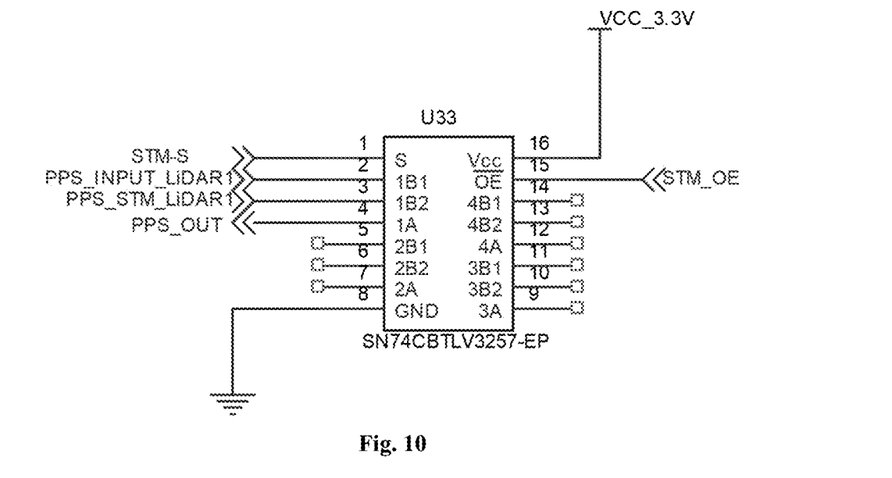
FIG. 10 is a schematic diagram of a chip used for Module 4 according to an embodiment of the present disclosure.

Referring to FIG. 10, Module 4 can be implemented with an SN74CBTLV3257 type of chip, which is referred to as U33 below. SN74CBTLV3257 is a four-channel one-out-of-two selection chip. In some examples, Module 4 can alternatively use other four-channel one-out-of-two selection chips with similar functions to the SN74CBTLV3257 chip, such as an SN3257, TMUX1574, or TS5N412 chip.

Figure 11:
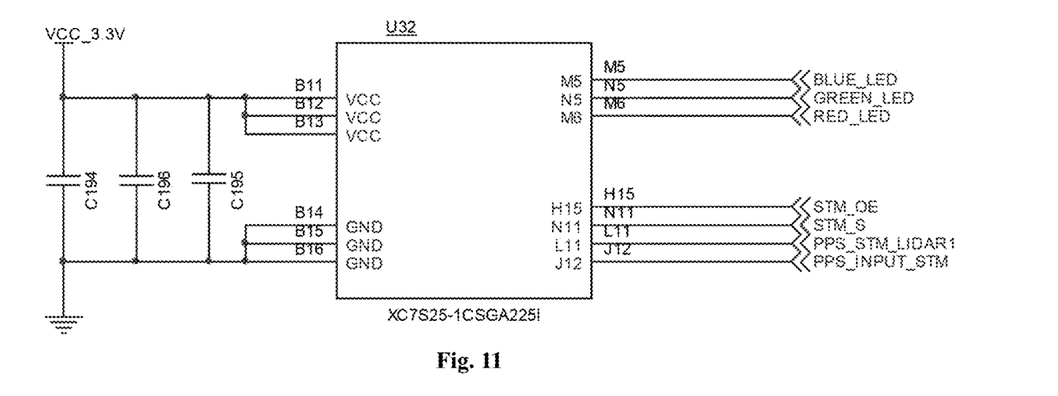
FIG. 11 is a schematic diagram of a chip used for Module 3 according to an embodiment of the present disclosure.

Referring to FIG. 11, Module 3 can be implemented with an XC7S25-1CSGA2251 type of FPGA chip, which is referred to as U32 below. In some examples, Module 3 can alternatively be implemented with a single-chip microcomputer, for example, an STM8S208CB type of single-chip microcomputer chip.

Figure 12:
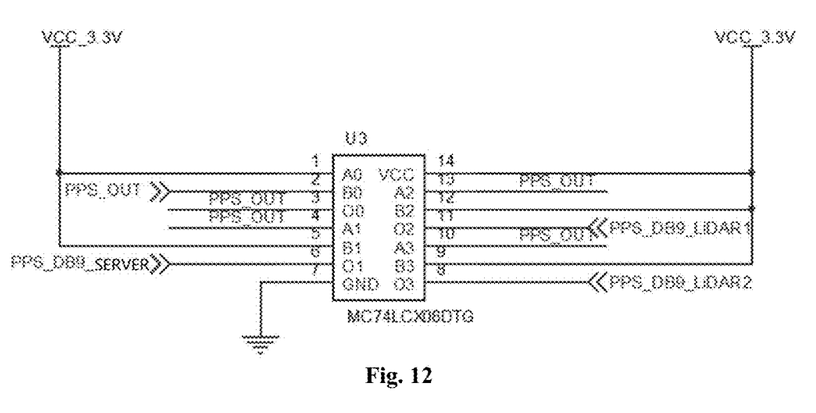
FIG. 12 is a schematic diagram of a chip used for Module 5 according to an embodiment of the present disclosure.

Referring to FIG. 12, Module 5 can be implemented with an MC74LCX08DG type of chip, which is referred to as U3 below. MC74LCX08DG is a four-channel AND gate chip. In some examples, Module 5 may alternatively use other AND gate chips with similar functions to the MC74LCX08DG chip, such as an SN74HCS08, CD54ACT08, or CD74HCT08 chip.

Figure 13:
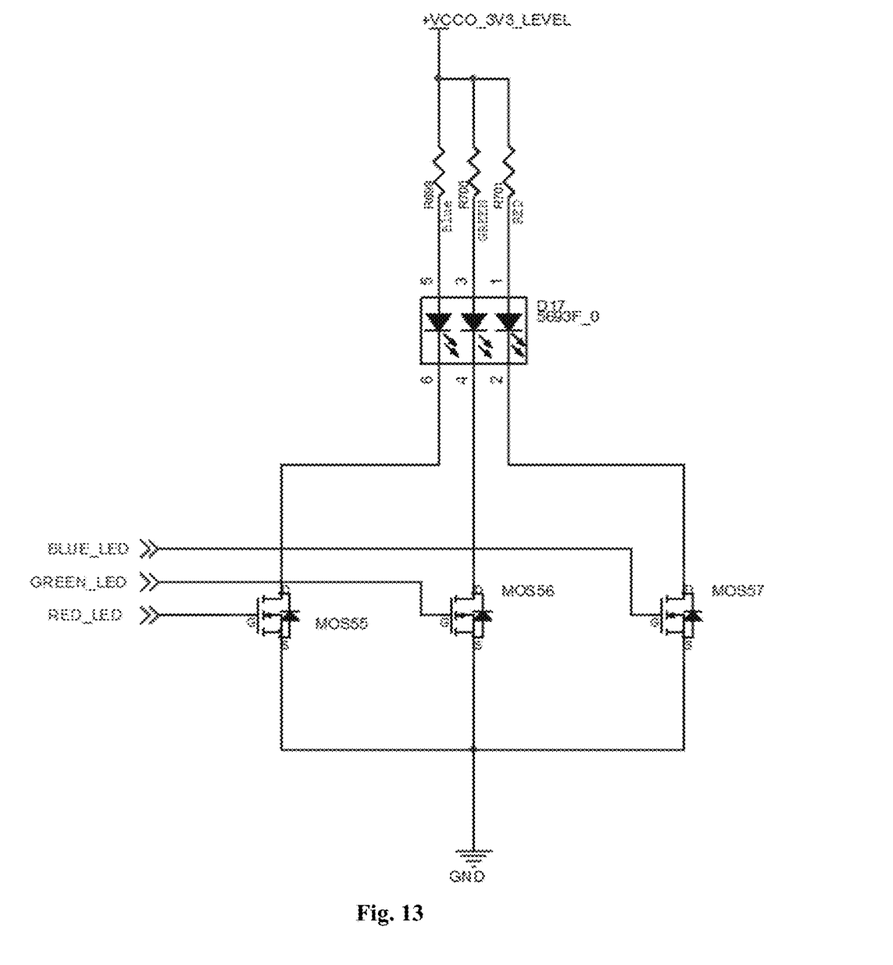
FIG. 13 is a schematic diagram of a chip used for Module 6 according to an embodiment of the present disclosure.

As shown in FIG. 13, Module 6 can be implemented with an LED status indicator.

Figure 14:
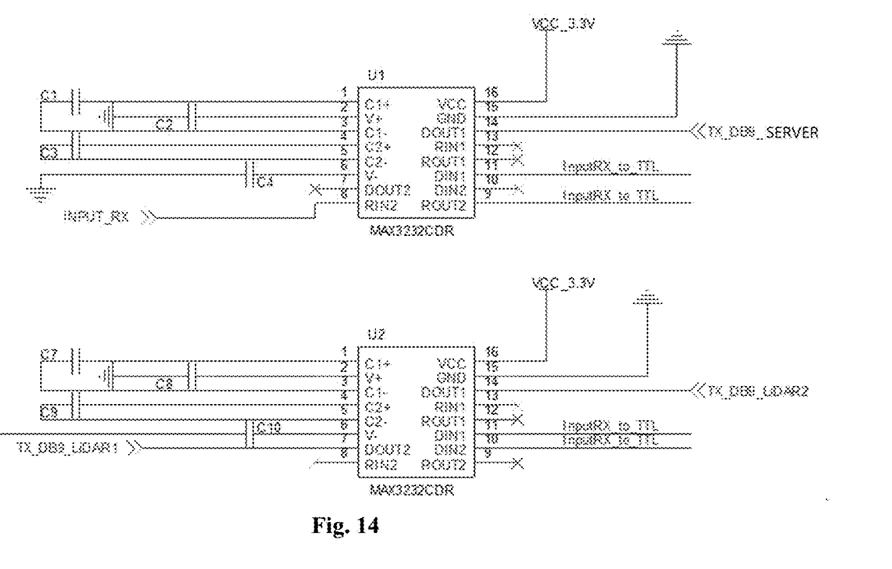
FIG. 14 is a schematic diagram of a chip used for Module 1 according to an embodiment of the present disclosure.

Referring to FIG. 14, Module 1 can be implemented with two MAX3232IDR chips, which are referred to as U1 and U2 below, respectively. In some examples, Module 1 can alternatively be implemented with other AND gate chips with similar functions to the MAX3232IDR chip, such as an AT3232, or SP3232 chip.

The connection relationship and operation processes of Module 1~Module 6 and Interface J1 and P1~P3 will be explained below.

Referring to FIG. 9, the inputs to each AND gate in the chip U34 correspond to Ax and Bx, and the outputs correspond to Ox. First, the PPS signal received by Interface J1 (represented as GPS_PPS in FIG. 9) is inputted to B0 of the chip U34, and A0 is pulled up. This is equivalent to a TTL buffer. O0 and A0 are logically consistent with each other, only the strength of the PPS signal is increased, and then the O0 signal (represented as PPS tempi in FIG. 9) is outputted to A2 and A3. In this way, for this part of the circuit, one PPS signal (represented as GPS_PPS in FIG. 9) is split into two signals to be outputted via O2 and O3 (represented as PPS_INPUT_STM and PPS_INPUT_LiDAR1 in FIG. 9), and O3 is connected to Pin 2 of the chip U33 and O2 is connected to Pin J12 of the chip U32.

Referring to FIG. 10, S Pin 1 of the chip U33 is connected to Pin N11 of the chip U32, $\overline{OE}$ Pin 15 of the chip U33 is connected to Pin H15 of the U32 chip, Pin 1B1 of the chip U33 (corresponding to the signal PPS_INPUT_LiDAR1 in FIG. 10) is connected to Pin 8 of the chip U34, Pin 1B2 (corresponding to the signal PPS_STM_LiDAR1 in FIG. 10) is connected to Pin L11 of the chip U32, Pin L11 of the chip U32 is connected to Pin 3 of the chip U33, the signal outputted from Pin L11 of the chip U32 is used as an input signal to the chip U33, and Pin 4 of the chip U33 (corresponding to the signal PPS_OUT in FIG. 10) is connected to Pin 2 of the chip U3. When Pin 1 and Pin 15 of the chip U33 are both at a low level, the signal connected to 1B1 is selected as the output. When Pin 1 of the chip U33 is at a low level and Pin 15 is at a high level, the signal connected to 1B2 is selected as the output.

As shown in FIG. 11, Pins M5, N5, and M6 of the chip U32 (corresponding to signals BLUE_LED, GREEN_LED, RED_LED in FIG. 11, respectively) are connected to an electrode G of a blue LED, an electrode G of a green LED, and an electrode G of a red LED, respectively, and configured to control on/off of the LED indicators. When the chip U32 starts to operate, Pin M6 outputs a high level to control the red LED to be turned on. When the chip U32 detects that there is an input signal PPS_INPUT_LiDAR1 at Pin J12, it controls Pin N5 to output a high level to turn on the green LED indicator. When the chip U32 does not detect the input signal PPS_INPUT_LiDAR1 at Pin J12, it controls Pin M5 to output a high level to turn on the blue LED indicator, and at the same time generates a PPS signal by imitation, and outputs the signal through Pin L11 (corresponding to the signal PPS_STM_LiDAR1 in FIG. 11). This output signal PPS_STM_LiDAR1 is connected to Pin 4 of the chip U33 and used as another input signal to the chip U33. Pin H15 (corresponding to the signal STM_OE in FIG. 11) and Pin N11 (corresponding to the signal STM_S in FIG. 11) of the chip U32 are connected to Pin 15 and Pin 1 of the chip U33, respectively, for controlling the chip U33 to select to use the PPS signal generated by the chip U32 by imitation or the PPS signal from the satellite positioning device Novatel as the output signal. When the chip U32 detects that the PPS signal from the satellite positioning device Novatel at Pin J12, it controls Pin H15 and Pin N11 to be at a low level. When the chip U32 detects no PPS signal from the satellite positioning device Novatel at Pin J12, it controls Pin H15 to be at a high level and Pin N11 to be at a low level.

As shown in FIG. 12, the inputs to each AND gate in the chip U3 corresponds to Ax and Bx, and the outputs correspond to Ox. The signal PPS_OUT outputted from the chip U33 is connected to B0 of the chip U3 as an input signal, and A0 is pulled up. This is equivalent to a TTL buffer. O0 and A0 are logically consistent with each other, only the strength of the signal PPS_OUT is increased, and then the O0 signal is outputted to A1, A2, and A3. In this way, for this part of the circuit, the signal PPS_OUT is split into three signals, and the signal output terminals O1, O2, and O3 (corresponding to signals PPS_DB9_server, PPS_DB9_LiDAR1, and PPS_DB9_LiDAR2 in FIG. 12) are connected to Pin 2 of Interface P1, Pin 3 of Interface P2, and Pin 3 of Interface P3, respectively, such that Interface P1, Interface P2, and Interface P3 can transmit the signal PPS_OUT to the server, the laser radar LiDAR1, and the laser radar LiDAR2, respectively, for triggering the server, the laser radar LiDAR1, and the laser radar LiDAR2 to perform predetermined actions.

As shown in FIG. 13, the LED status indicator is composed of current limiting resistors R699, R700, and R701, a three-color LED indicator D17, and three N MOSEFTs MOS55, MOS56, and MOS57. When the G terminal of MOS55 is at a high level, the blue LED is turned on; when the G terminal of MOS56 is at a high level, the green LED is turned on, and when the G terminal of MOS57 is at a high level, the red LED is turned on.

As shown in FIG. 14, the chips U1 and U2 can convert two sets of RS232 TX and RX signals into corresponding TTL signals. The RS232 signal from the satellite positioning device Novatel is connected to Pin 8 of the chip U1 (corresponding to the signal INPUT RX in FIG. 14), and the chip U1 will convert the signal into a TTL signal and output it from Pin 9 (corresponding to the signal InputRX_to_TTL in FIG. 14), which is connected to Pin 11 of the chip U1 and Pin 10 and Pin 11 of the chip U2, such that the chips U1 and U2 will convert these three signals into RS232 signals. The corresponding pins for outputting the RS232 signals are Pin 14 of the chip U1 (corresponding to the signal TX_DB9_server in FIG. 14), which is connected to Pin 1 of Interface P1, Pin 14 of the chip U2 (corresponding to the signal TX_DB9_LiDAR2 in FIG. 14), which is connected to Pin 1 of Interface P3, and Pin 7 of the chip U2 (corresponding to the signal TX_DB9_LiDAR1 in FIG. 14), which is connected to Pin 1 of Interface P2. In this way, Interface P1, Interface P2, and Interface P3 can transmit the signal TX_DB9_server, the signal TX_DB9_LiDAR1 and the signal TX_DB9_LiDAR2 to the server, the laser radar LiDAR1, and the laser radar LiDAR2, respectively, such that the server, the laser radar LiDAR1, and the laser radar LiDAR2 can be synchronized with the clock source.

Figure 15:
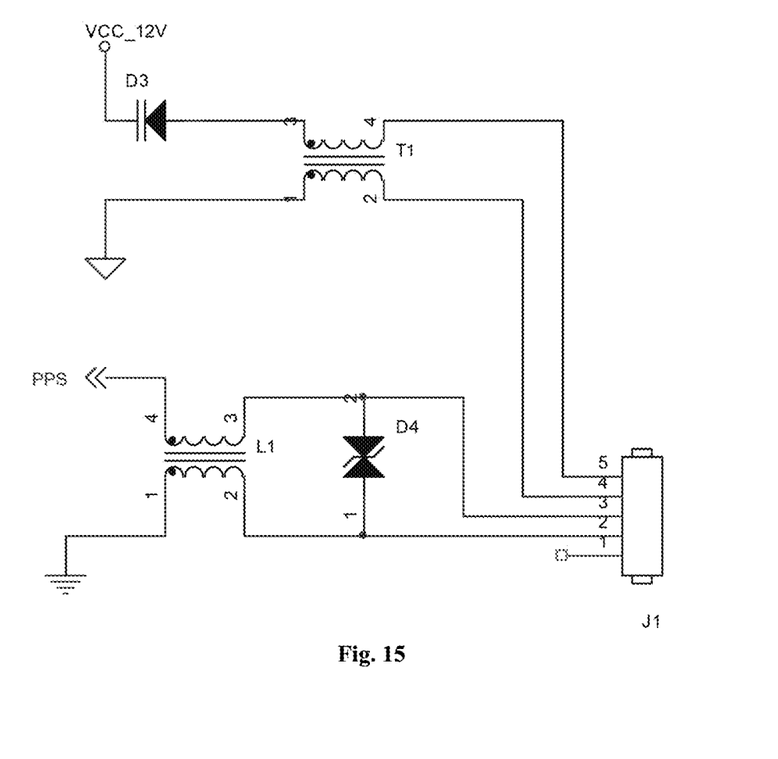
FIG. 15 is a schematic diagram of a chip used for Interface J1 according to an embodiment of the present disclosure.

As shown in FIG. 15, Pin 4 of Interface J1 is connected to a power ground, Pin 5 of Interface J1 is connected to a 12V power source, a common mode inductor T1 is configured to filter out the common mode interference on the power line, and a diode D3 is provided to prevent the power source from being connected reversely. Pin 3 of Interface J1 is connected to the PPS signal from the satellite positioning device Novatel, Pin 2 is connected to a signal ground, a diode D4 is a TVS protection diode, and a common mode inductor L1 is configured to filter out common mode interference signals.

Figure 16:
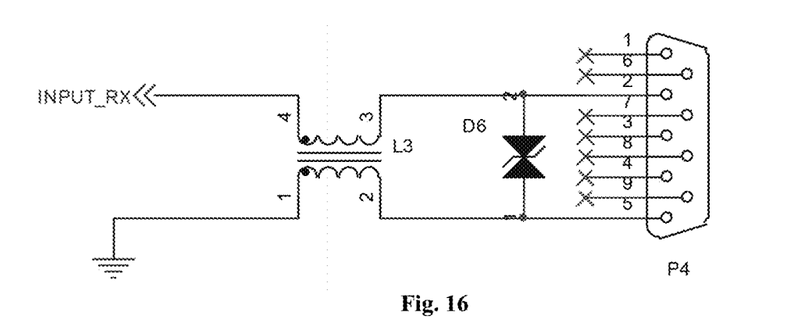
FIG. 16 is a schematic diagram of a chip used for Interface P4 according to an embodiment of the present disclosure.

As shown in FIG. 16, Pin 2 of Interface P4 is connected to the RS232 signal from the satellite positioning device Novatel, a diode D6 is a TVS protection diode, and a common mode inductor L3 is configured to filter out common mode interference signals.

Figure 17:
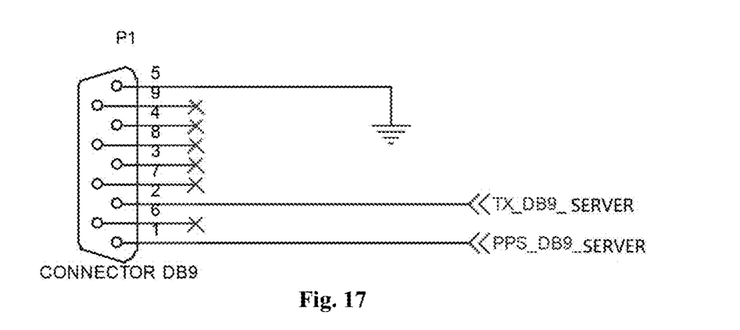
FIG. 17 is a schematic diagram of a chip used for Interface P1 according to an embodiment of the present disclosure.

As shown in FIG. 17, Pin 2 of Interface P1 (corresponding to the signal TX_DB9_server in FIG. 15) is connected to Pin 14 of the chip U1 as the output RS232 signal, and Pin 1 of Interface P1 (corresponding to the signal TX_DB9_server in FIG. 15) is connected to Pin 6 of the chip U3 as the output TTL signal.

Figure 18:
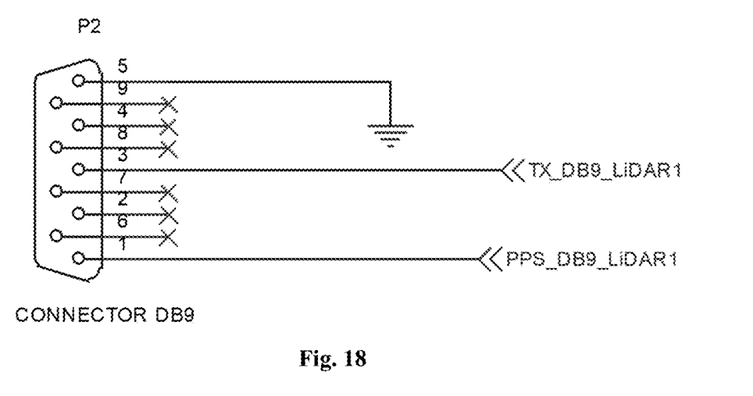
FIG. 18 is a schematic diagram of a chip used for Interface P2 according to an embodiment of the present disclosure.

As shown in FIG. 18, Pin 3 of Interface P2 (corresponding to the signal TX_DB9_LiDAR1 in FIG. 15) is connected to Pin 7 of the chip U2 as the output RS232 signal, and Pin 1 of Interface P2 (corresponding to the signal PPS_DB9_LiDAR1 in FIG. 15) is connected to Pin 11 of the chip U3 as the output TTL signal.

Figure 19:
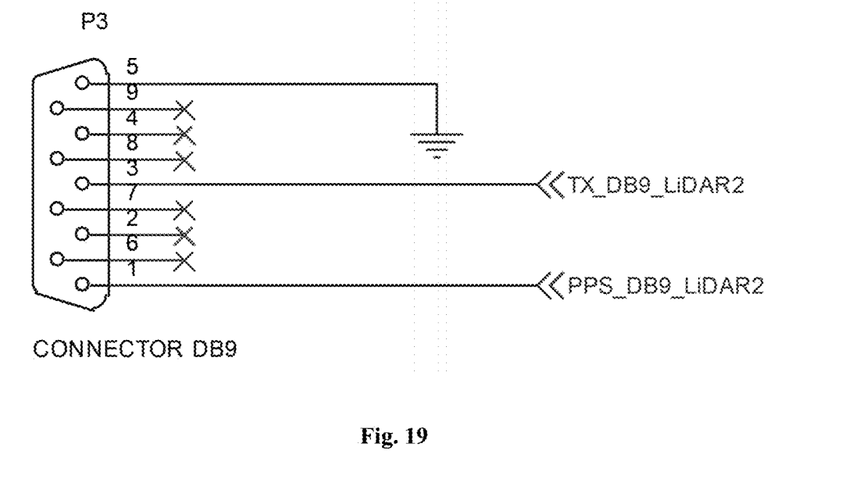
FIG. 19 is a schematic diagram of a chip used for Interface P3 according to an embodiment of the present disclosure.

As shown in FIG. 19, Pin 3 of Interface P3 (corresponding to the signal TX_DB9_LiDAR2 in FIG. 15) is connected to Pin 14 of the chip U2 as the output RS232 signal, and Pin 1 of Interface P2 (corresponding to the signal PPS_DB9_LiDAR2 in FIG. 15) is connected to Pin 8 of the chip U3 as the output TTL signal.

What is claimed is:

1. An on-board synchronization device, comprising a first circuit and at least one second circuit, wherein
   the first circuit is configured to receive an initial signal containing Universal Time Coordinated (UTC), generate a first signal containing the UTC, and output the first signal to at least one on-board device, such that the at least one on-board device synchronizes its built-in clock with the UTC based on the first signal, and
   the second circuit is configured to receive a Pulse Per Second (PPS) signal, generate a periodic second signal with a same phase as the PPS signal, and output the second signal or the PPS signal to the at least one on-board device, such that the at least one on-board device performs a predetermined action based on the second signal or the PPS signal,
   wherein the second circuit comprises a second signal generating and processing module, and a pulse signal one-out-of-two selection module,
   wherein the second signal generating and processing module is configured to generate a second signal based on the PPS signal, generate a signal source switching control signal, and output the second signal and the signal source switching control signal to the pulse signal one-out-of-two selection module, and
   wherein the pulse signal one-out-of-two selection module is configured to output the PPS signal or the second signal in accordance with the signal source switching control signal.

2. The on-board synchronization device of claim 1, wherein the first circuit comprises: a time signal input terminal, a first signal generating module, and a plurality of first signal output terminals, wherein
   the time signal input terminal is configured to receive the initial signal containing the UTC and output it to the first signal generating module,
   the first signal generating module is configured to generate the first signal based on the initial signal containing the UTC, and output it to each of the plurality of first signal output terminals, and
   each of the plurality of first signal output terminals is connected to one or more on-board devices and is configured to output the first signal to the connected one or more on-board devices.

3. The on-board synchronization device of claim 1, wherein the second circuit further comprises: a pulse signal input terminal, a pulse signal one-to-two splitter module, a pulse signal one-to-multiple splitter module, and a plurality of second signal output terminals, wherein
   the pulse signal input terminal is configured to receive the PPS signal and output the PPS signal to the pulse signal one-to-two splitter module,
   the pulse signal one-to-two splitter module is configured to output the PPS signal to the second signal generating and processing module and the pulse signal one-out-of-two selection module, respectively,
   the pulse signal one-to-multiple splitter module is configured to receive the PPS signal or the second signal from the pulse signal one-out-of-two selection module and output the PPS signal or the second signal to each of the plurality of second signal output terminals, and
   each of the plurality of second signal output terminals is connected to one or more on-board devices and is configured to output the PPS signal or the second signal to the connected one or more on-board devices.

4. The on-board synchronization device of claim 3, wherein the second circuit further comprises a display device, and
   the second signal generating and processing module is further configured to generate a type indication signal and output it to the display device, and
   the display device is configured to displaying based on the type indication signal to indicate whether the second signal or the PPS signal is outputted to the on-board device.

5. The on-board synchronization device of claim 3, wherein the second signal generating and processing module is further configured to generate a status indication signal and output it to a display device, wherein
   the display device is configured to display based on the status indication signal to indicate an operation status of the on-board synchronization device.

6. The on-board synchronization device of claim 3, wherein the second signal generating and processing module is a Field Programmable Gate Array (FPGA) device or a single-chip microcomputer.

7. The on-board synchronization device of claim 1, wherein the first circuit is configured to receive the initial signal containing the UTC from a satellite positioning device, the second circuit is configured to receive the PPS signal from the satellite positioning device, and the satellite positioning device and the on-board device are located on a same smart machine.

8. The on-board synchronization device of claim 2, wherein the first circuit is configured to receive the initial signal containing the UTC from a satellite positioning device, the second circuit is configured to receive the PPS signal from the satellite positioning device, and the satellite positioning device and the on-board device are located on a same smart machine.

9. The on-board synchronization device of claim 3, wherein the first circuit is configured to receive the initial signal containing the UTC from a satellite positioning device, the second circuit is configured to receive the PPS signal from the satellite positioning device, and the satellite positioning device and the on-board device are located on a same smart machine.

10. The on-board synchronization device of claim 4, wherein the first circuit is configured to receive the initial signal containing the UTC from a satellite positioning device, the second circuit is configured to receive the PPS signal from the satellite positioning device, and the satellite positioning device and the on-board device are located on a same smart machine.

11. The on-board synchronization device of claim 5, wherein the first circuit is configured to receive the initial signal containing the UTC from a satellite positioning device, the second circuit is configured to receive the PPS signal from the satellite positioning device, and the satellite positioning device and the on-board device are located on a same smart machine.

12. The on-board synchronization device of claim 1, wherein the on-board device comprises one or more of:
   a laser radar, a millimeter wave radar, an ultrasonic radar, a laser rangefinder, a Time-of-Flight (TOF) camera, a binocular stereo vision camera, a structured light based depth camera, an infrared camera, an industrial controller, a server, or an Application Specific Integrated Circuit (ASIC).

13. A smart machine, comprising:
   at least one on-board device;
   a satellite positioning device; and
   an on-board synchronization device, comprising a first circuit and at least one second circuit, wherein
   the first circuit is configured to receive an initial signal containing Universal Time Coordinated (UTC), generate a first signal containing the UTC, and output the first signal to at least one on-board device, such that the at least one on-board device synchronizes its built-in clock with the UTC based on the first signal, and
   the second circuit is configured to receive a Pulse Per Second (PPS) signal, generate a periodic second signal with a same phase as the PPS signal, and output the second signal or the PPS signal to the at least one on-board device, such that the at least one on-board device performs a predetermined action based on the second signal or the PPS signal,
   wherein the second circuit comprises a second signal generating and processing module, and a pulse signal one-out-of-two selection module,
   wherein the second signal generating and processing module is configured to generate a second signal based on the PPS signal, generate a signal source switching control signal, and output the second signal and the signal source switching control signal to the pulse signal one-out-of-two selection module, and
   wherein the pulse signal one-out-of-two selection module is configured to output the PPS signal or the second signal in accordance with the signal source switching control signal.

14. The smart machine of claim 13, wherein the first circuit comprises: a time signal input terminal, a first signal generating module, and a plurality of first signal output terminals, wherein
   the time signal input terminal is configured to receive the initial signal containing the UTC and output it to the first signal generating module,
   the first signal generating module is configured to generate the first signal based on the initial signal containing the UTC, and output it to each of the plurality of first signal output terminals, and
   each of the plurality of first signal output terminals is connected to one or more on-board devices and is configured to output the first signal to the connected one or more on-board devices.

15. The smart machine of claim 13, wherein the second circuit further comprises: a pulse signal input terminal, a pulse signal one-to-two splitter module, a pulse signal one-to-multiple splitter module, and a plurality of second signal output terminals, wherein
   the pulse signal input terminal is configured to receive the PPS signal and output the PPS signal to the pulse signal one-to-two splitter module,
   the pulse signal one-to-two splitter module is configured to output the PPS signal to the second signal generating and processing module and the pulse signal one-out-of-two selection module, respectively,
   the pulse signal one-to-multiple splitter module is configured to receive the PPS signal or the second signal from the pulse signal one-out-of-two selection module and output the PPS signal or the second signal to each of the plurality of second signal output terminals, and
   each of the plurality of second signal output terminals is connected to one or more on-board devices and is configured to output the PPS signal or the second signal to the connected one or more on-board devices.

16. The smart machine of claim 15, wherein the second circuit further comprises a display device, and the second signal generating and processing module is further configured to generate a type indication signal and output it to the display device, and the display device is configured to displaying based on the type indication signal to indicate whether the second signal or the PPS signal is outputted to the on-board device.

17. The smart machine of claim 15, wherein the second signal generating and processing module is further configured to generate a status indication signal and output it to a display device, wherein the display device is configured to display based on the status indication signal to indicate an operation status of the on-board synchronization device.

18. The smart machine of claim 15, wherein the second signal generating and processing module is a Field Programmable Gate Array (FPGA) device or a single-chip microcomputer.

19. The smart machine of claim 13, wherein the first circuit is configured to receive the initial signal containing the UTC from a satellite positioning device, the second circuit is configured to receive the PPS signal from the satellite positioning device, and the satellite positioning device and the on-board device are located on a same smart machine.

20. The smart machine of claim 13, wherein the on-board device comprises one or more of:

a laser radar, a millimeter wave radar, an ultrasonic radar, a laser rangefinder, a Time-of-Flight (TOF) camera, a binocular stereo vision camera, a structured light based depth camera, an infrared camera, an industrial controller, a server, or an Application Specific Integrated Circuit (ASIC).

* * * * *